United States Patent

Blum et al.

[11] Patent Number: 5,952,116
[45] Date of Patent: Sep. 14, 1999

[54] SOLID ELECTROLYTE HIGH TEMPERATURE FUEL CELL MODULE AND METHOD FOR ITS OPERATION

[75] Inventors: Ludger Blum, Eltersdorf; Horst Greiner, Forchheim; Wilhelm Kleinlein, Fürth; Reinhard Roth, Baiersdorf, all of Germany

[73] Assignee: Siemens Aktiengesellschaft

[21] Appl. No.: 08/912,407

[22] Filed: Aug. 18, 1997

Related U.S. Application Data

[63] Continuation of application No. PCT/DE96/00226, Feb. 13, 1996.

[30] Foreign Application Priority Data

Feb. 16, 1995 [DE] Germany .......................... 195 05 274

[51] Int. Cl.⁶ .................................................. H01M 8/12
[52] U.S. Cl. .................................................. 429/26; 429/32
[58] Field of Search .................................. 429/13, 20, 26, 429/32

[56] References Cited

U.S. PATENT DOCUMENTS

| | | |
|---|---|---|
| 3,861,959 | 1/1975 | Cadiou . |
| 4,644,751 | 2/1987 | Hsu .......................................... 60/676 |
| 4,877,693 | 10/1989 | Baker .................................... 429/20 X |
| 5,338,622 | 8/1994 | Hsu et al. ................................. 429/26 |
| 5,426,002 | 6/1995 | Matsumura et al. ...................... 429/20 |
| 5,595,833 | 1/1997 | Gardner et al. ....................... 429/32 X |

FOREIGN PATENT DOCUMENTS

| | | |
|---|---|---|
| 0 399 077 A1 | 11/1990 | European Pat. Off. . |
| 0 473 540 A2 | 3/1992 | European Pat. Off. . |
| 2182650 | 12/1973 | France . |
| 39 35 722 A1 | 5/1991 | Germany . |
| 40 37 970 A1 | 6/1991 | Germany . |
| 40 09 138 A1 | 9/1991 | Germany . |
| 42 17 892 A1 | 12/1992 | Germany . |
| 41 37 968 A1 | 5/1993 | Germany . |
| 59-75573 | 10/1982 | Japan . |
| 58-119168 | 7/1983 | Japan . |
| 61-24169 | 7/1984 | Japan . |
| 7-22059 | 1/1995 | Japan . |
| 92/16029 | 9/1992 | WIPO . |
| 94/22177 | 9/1994 | WIPO . |
| 96/05625 | 2/1996 | WIPO . |

OTHER PUBLICATIONS

"Fuel Cell Handbook" (Appleby), Editor Van Nostrand Reinhold, New York, chapter 13, pp. 440–454; 1989—Month N.A.

"Fuel Cells as Energy Transformers" (Drenckhahn et al.), Energy Techniques, vol. 6, pp. 383–389. 1993—Month Unknown.

*Primary Examiner*—Stephen Kalafut
*Attorney, Agent, or Firm*—Herbert L. Lerner; Laurence A. Greenberg

[57] ABSTRACT

In a solid electrolyte high temperature fuel cell module and a method for operating the same, a plurality of fuel cells are stacked on one another for receiving an operating medium necessary for operating the fuel cells. Heat produced in the fuel cells during a combustion process is used for heating the operating medium before it is fed into the fuel cells.

7 Claims, 4 Drawing Sheets

SOLID ELECTROLYTE HIGH TEMPERATURE FUEL CELL MODULE AND METHOD FOR ITS OPERATION

CROSS-REFERENCE TO RELATED APPLICATION

This application is a continuation of International Application Ser. No. PCT/DE96/00226, filed Feb. 13, 1996.

BACKGROUND OF THE INVENTION

Field of the Invention

The invention relates to a solid electrolyte high temperature fuel cell module and a method for its operation.

It is known that during the electrolysis of water, water molecules are decomposed into hydrogen and oxygen by an electric current. In a fuel cell, that procedure runs in the opposite direction. During the electrochemical joining of hydrogen and oxygen to form water, electric current is produced with a high efficiency, and without the emission of pollutants and carbon monoxide if pure hydrogen is used as a fuel gas. Even when using industrial fuel gases, for example natural gas, and using air instead of pure oxygen, the fuel cell produces distinctly fewer pollutants and less $CO_2$ than other technologies of fossil energy carriers. The industrial implementation of that principle has led to very different solutions, with various types of electrolytes and operating temperatures between 80° C. and 1000° C.

In the solid electrolyte high temperature fuel cell (Solid Oxide Fuel Cell or SOFC), natural gas is used as the primary energy source. A power density of 1 $MW/m^3$ enables a very compact construction. Heat which is additionally produced has a temperature of over 900° C.

In the case of a solid electrolyte high temperature fuel cell module, the fuel cell module is also referred to as a "stack" in the technical literature. A window film, a solid electrolyte electrode element, a further window film, a further bipolar plate, and so on, disposed one on another, are provided in that order underneath an upper bipolar covering plate. In that case, a solid electrolyte electrode element lying between two adjacent bipolar plates, including the window films resting directly on both sides of the solid electrolyte electrode element and those sides of each of the two bipolar plates resting on the window films, together form a solid electrolyte high temperature fuel cell.

That type and further types of fuel cell modules are known, for example, from the "Fuel Cell Handbook" by A. J. Appelby and F. R. Foulkes, Van Nostraud Reinhold, pages 442 to 454, or from the article "Brennstoffzellen als Energiewandler" [Fuel Cells as Energy Converters], in Energiewirtschaftliche Tagesfragen, June 1993, issue 6, pages 382 to 390.

German Published, Non-Prosecuted Patent Applications DE 39 35 722 A1 and DE 40 09 138 A1 disclose solid electrolyte high temperature fuel cell modules which include a plurality of solid electrolyte high temperature fuel cells that are connected in series, are planar and rest firmly on one another. A bipolar plate which is installed between directly adjacent cells that are connected in series, electrically conductively connects the cathode of one cell to the anode of the directly adjacent cell and ensures a supply of operating gas through the use of ducts that are let in on both sides. In that case, the ducts conveying the operating gas are disposed parallel to the longitudinal axis of the solid electrolyte high temperature fuel cell module and extend through the entire solid electrolyte high temperature fuel cell module.

A significant problem during the operation of a solid electrolyte high temperature fuel cell module is in dissipating heat produced during the reaction out of the solid electrolyte high temperature fuel cell module. Part of the heat is dissipated through the operating medium. The amount of heat dissipated through the operating medium becomes greater as the temperature difference between the inflowing and outflowing operating media becomes higher. A higher temperature difference can lead to a lower operating temperature of the fuel cells, if the operating media flow into the solid electrolyte high temperature fuel cell module at a lower temperature, which leads to a reduction in the power capacity of the solid electrolyte electrode element.

At the same time, because of the temperature differences in the active cell region, there is the risk that the mechanically sensitive electrolytes will be damaged.

A further problem arises during operation with operating media to be reformed. As a result of the reforming reaction, the region for the feeding in of the operating media is additionally cooled, which likewise leads to mechanical stresses in the electrolytes.

Furthermore, German Published, Non-Prosecuted Patent Application DE 42 17 892 A1 discloses a fuel cell configuration in which a waste gas from a stack chamber, that includes a multiplicity of solid electrolyte fuel cells, is burned outside the stack chamber in a combustion chamber. The heat of the combustion gas is transferred to an oxidation gas and a reaction gas in a heat exchanger connected downstream of the stack chamber, and the gases are subsequently fed to the stack chamber in order to operate the solid electrolyte fuel cells.

A high temperature fuel cell stack with an integrated heat exchanger configuration for the dissipation of the heat released from the same is also disclosed by German Published, Non-Prosecuted Patent Application DE 41 37 968 A1, corresponding to U.S. application Ser. No. 08/245, 862, filed May 19, 1994, now abandoned. In that document, a waste gas is heated to the necessary input temperature of the gas turbine within the high temperature fuel cell stack, for further use in a gas turbine connected downstream. In addition, an oxidation gas and a reaction gas for the high temperature fuel cell stack are heated outside the high temperature fuel cell stack, using the heat which is released.

SUMMARY OF THE INVENTION

It is accordingly an object of the invention to provide a solid electrolyte high temperature fuel cell module and a method for its operation, which overcome the hereinaforementioned disadvantages of the heretofore-known devices and methods of this general type and in which heat is used efficiently and with a low technical outlay to heat operating media.

With the foregoing and other objects in view there is provided, in accordance with the invention, a method for operating a solid electrolyte high temperature fuel cell module, which comprises stacking a plurality of fuel cells on one another; passing an operating medium necessary for operating the fuel cells through a slotlike duct section inside the solid electrolyte high temperature fuel cell module for picking up heat produced in the fuel cells during a combustion process; and then feeding the operating medium to the fuel cells.

Some of the heat produced in the fuel cells is thus transferred to the operating medium outside the fuel cells but within the solid electrolyte high temperature fuel cell module. Given a suitable selection of the temperature of the operating medium before it is fed into the solid electrolyte high temperature fuel cell module, the operating medium is heated by this heat transfer to the temperature necessary for the operation of the fuel cells, so that virtually no reduction in the power capacity of the solid electrolyte high temperature fuel cell module occurs. The operating medium can thus be used for cooling the fuel cell module, as a result of a low input temperature, without a reduction in the power occurring. Due to the heating of the operating medium and the resultant reduction in the temperature differences in the active cell region, the mechanically sensitive electrolyte is also not damaged. Since the temperature at the introduction of the operating media into the solid electrolyte high temperature fuel cell module is lower than in the case of the known methods, the mass flow of operating media which is necessary for the dissipation of heat is reduced. A compact construction of the solid electrolyte high temperature fuel cell module is made possible through the use of the method of the invention.

With the objects of the invention in view there is also provided a solid electrolyte high temperature fuel cell module having a given edge, a longitudinal axis and a given length, comprising a plurality of fuel cells stacked on one another for receiving an operating medium necessary for operating the fuel cells; and first and second duct sections constructed as slot-like apertures inside the solid electrolyte high temperature fuel cell module for heating the operating medium before the operating medium flows into the fuel cells; the first duct section disposed at the given edge, extending approximately parallel to the longitudinal axis, extending over the entire given length and opening into the second duct section; and the second duct section disposed approximately parallel to the first duct section and communicating with the fuel cells.

The operating medium is thus heated on a path which approximately corresponds to the length of the solid electrolyte high temperature fuel cell module, before it is fed into the fuel cells.

In accordance with another feature of the invention, the first duct section includes a first subsection, which is disposed approximately parallel to the longitudinal axis at the edge of the solid electrolyte high temperature fuel cell module. The first subsection, which extends over the entire length of the solid electrolyte high temperature fuel cell module, opens into a second subsection running approximately perpendicular with respect to the longitudinal axis. The second subsection opens into a third subsection, which is disposed approximately parallel to the longitudinal axis on the opposite edge and extends over the entire length of the solid electrolyte high temperature fuel cell module. This third subsection opens into the second duct section, which is disposed approximately parallel to the third subsection of the first duct section and communicates with the fuel cells. In this particular configuration, the operating medium is thus heated on a path which corresponds to more than twice the length of the solid electrolyte high temperature fuel cell module, before it is fed into the fuel cells.

In accordance with a further feature of the invention, the first and/or the second duct section in each case includes at least two parallel duct sections. The surface for picking up the heat is enlarged by increasing the number of duct sections. This leads to an improved heat dissipation from the solid electrolyte high temperature fuel cell module.

In accordance with an added feature of the invention, the duct sections have a circular cross section.

In accordance with a concomitant feature of the invention, the first and second duct section for feeding and heating the operating medium are coated with catalytic material for reforming a combustion medium contained in the operating medium. As a result, the combustion medium is already reformed before it is fed into the fuel cells, and the mechanical stresses in the solid electrolyte electrode element, which occur because of the temperature differences during the reforming in the fuel cell, are largely avoided.

Other features which are considered as characteristic for the invention are set forth in the appended claims.

Although the invention is illustrated and described herein as embodied in a solid electrolyte high temperature fuel cell module and a method for its operation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
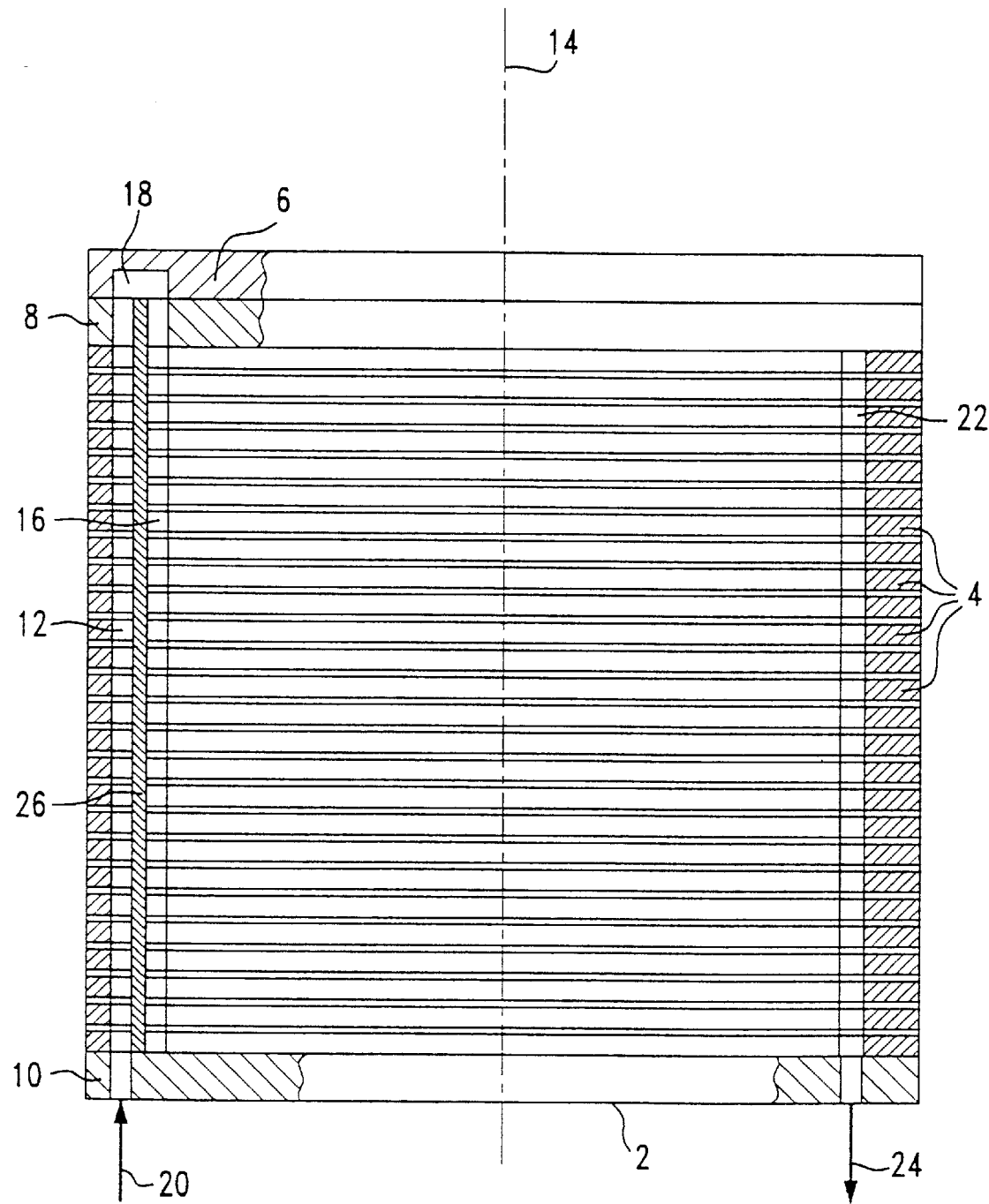
FIG. 1 is a diagrammatic, partly broken-away, cross-sectional view of a solid electrolyte high temperature fuel cell module according to the invention, which is taken along a line I—I of FIG. 2, in the direction of the arrows.

Referring now to the figures of the drawings in detail and first, particularly, to FIG. 1 thereof, there is seen a solid electrolyte high temperature fuel cell module 2 which includes a multiplicity of rectangular, plate-like fuel cells 4. The solid electrolyte high temperature fuel cell module 2 is closed off at the top and at the bottom by using two cover plates 6 and 8 and a baseplate 10. A first duct section 12 is disposed at an edge of the solid electrolyte high temperature fuel cell module 2, approximately parallel to a longitudinal axis 14 of the latter, and extends over the entire length of the solid electrolyte high temperature fuel cell module 2.

A second duct section 16 which is disposed approximately parallel to the first duct section 12, communicates with the fuel cells 4. The first duct section 12 and the second duct section 16 open into a cut-out 18, which is disposed in the cover plate 6. An operating medium, for example hydrogen or oxygen, having a flow direction which is indicated by an arrow 20, flows through the baseplate 10 into the solid electrolyte high temperature fuel cell module 2. The operating medium 20 passes through the first duct section 12 and the cut-out 18 into the second duct section 16, which communicates with the fuel cells 4. After a reaction, in other words combustion, is carried out there, the operating medium is led away through a third duct section 22 and the baseplate 10. A flow direction of the emerging operating medium is indicated by an arrow 24.

Some heat produced in the fuel cells 4 is thus transferred to the operating medium outside the fuel cells 4 but within the solid electrolyte high temperature fuel cell module 2, before it is fed into the fuel cells 4.

The first and second duct sections 12 and 16 are separated in this embodiment by a partition 26 made of insulating ceramic, for example $Al_2O_3$, $ZrO_2$, (YSZ) or $MgAl_2O_4$-Spinel.

Figure 2:
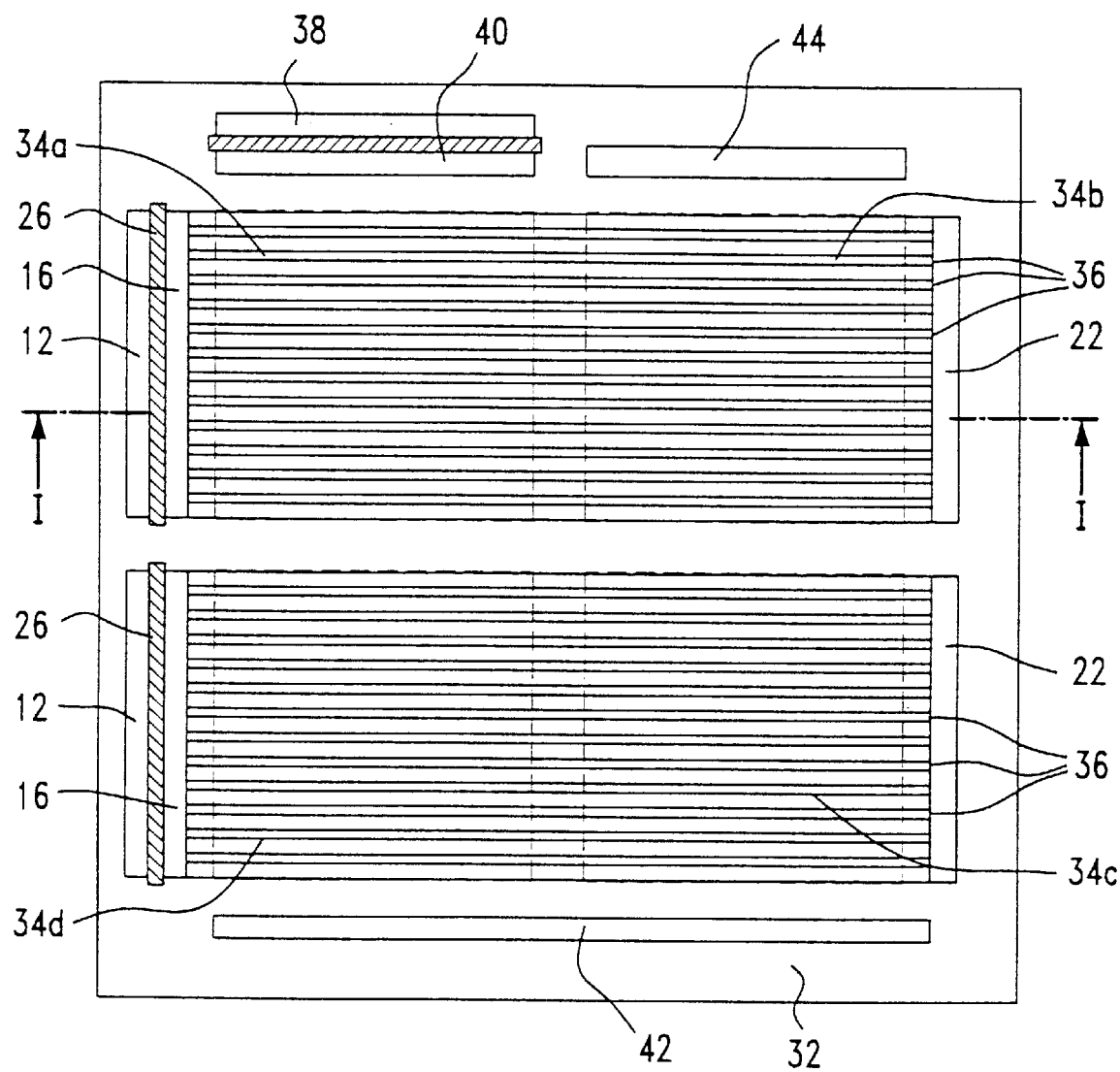
FIG. 2 is a plan view of a bipolar plate of the solid electrolyte high temperature fuel cell module of FIG. 1 according to the invention.

FIG. 2 is a plan view which shows the construction of a bipolar plate 32 constructed according to the cross-cocurrent principle. The bipolar plate 32 is constructed in one piece. The first and second duct sections 12 and 16 are formed by respective slot-like apertures which are disposed at an edge of the bipolar plate 32, in a 2×2 cell configuration 34a, 34b, 34c and 34d for an operating medium. The apertures communicate with a grooved area 36, which supplies the operating medium to a solid electrolyte electrode element that is an actual reaction space.

This grooved area 36, which is composed of directly adjacent grooves, covers virtually the entire area of the bipolar plate 32, with the exception of an edge region. The grooved area 36 communicates with other slot-like apertures forming the third duct section 22 for the discharge of the operating medium. Further slot-like apertures forming other respective first and second duct sections 38 and 40 convey a second operating medium to the solid electrolyte electrode element and are deflected in parallel through additional slot-like aperture forming a duct section 42. A non-illustrated grooved area which communicates with the duct sections 40, 42 and a duct section 44 is disposed at right angles to the grooved area 36, hence the term cross-cocurrent principle. That grooved area is located on the opposite or remote side of the bipolar plate 32.

Figure 3:
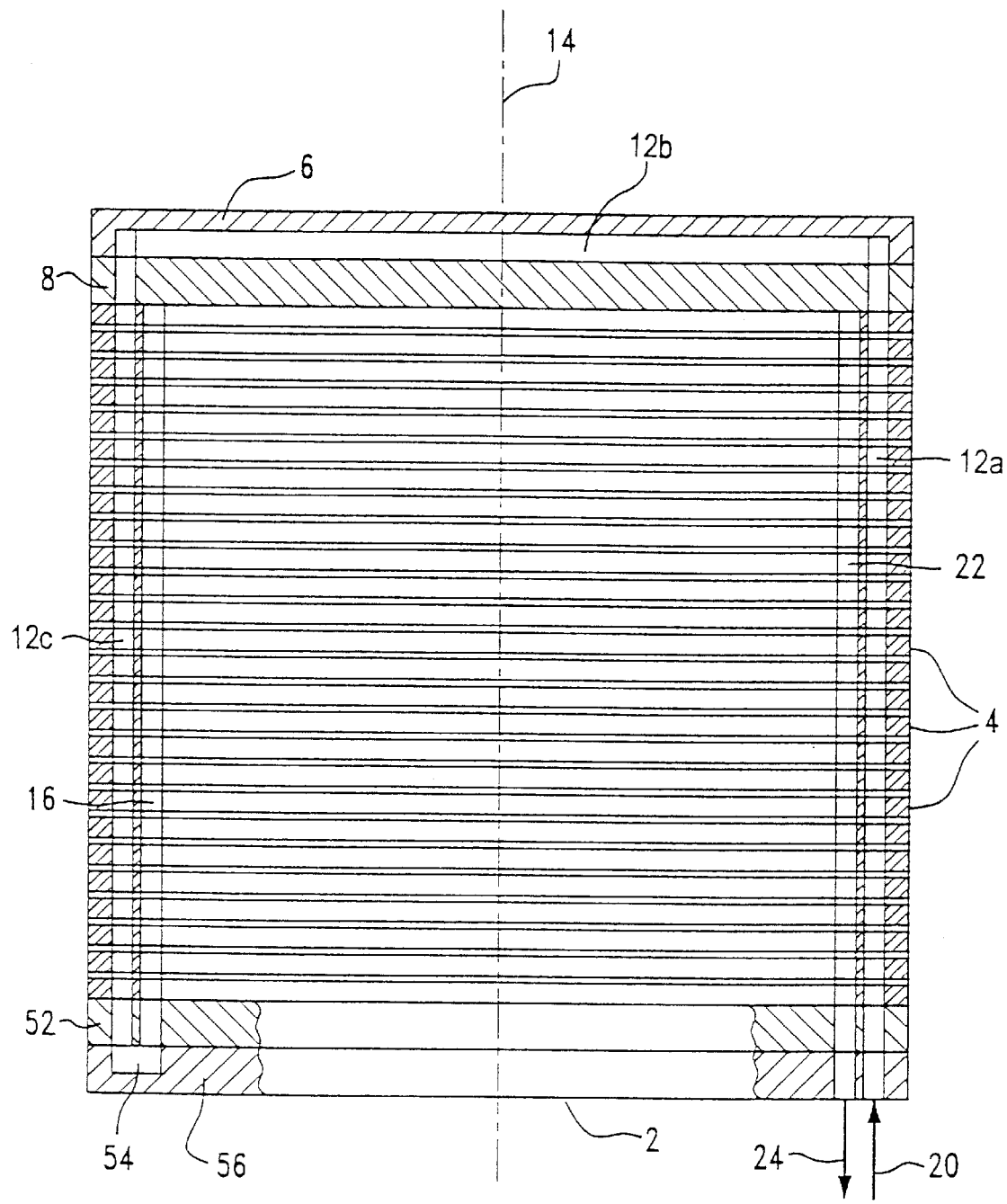
FIG. 3 is a partly broken-away, cross-sectional view of a solid electrolyte high temperature fuel cell module according to the invention, which is taken along a line III—III of FIG. 4, in the direction of the arrows.

A further embodiment is depicted in FIG. 3. The solid electrolyte high temperature fuel cell module 2 in this embodiment includes a multiplicity of rectangular, plate-like fuel cells 4 and is closed off at the top and bottom by two cover plates 6 and 8 and two base plates 52 and 56.

The introduction and discharge of the operating media, which is indicated by respective arrows 20 and 24 showing the flow directions of the operating media, is carried out on the same side of the solid electrolyte high temperature fuel cell module 2, through the base plates 52 and 56. In this configuration, the first duct section 12 includes a first subsection 12a, which is disposed approximately parallel to the longitudinal axis 14 at the edge of the solid electrolyte high temperature fuel cell module 2. The first subsection 12a is disposed parallel to the third duct section 22, which carries away the operating medium after the reaction has been carried out in the fuel cells.

The first subsection 12a, which extends over the entire length of the solid electrolyte high temperature fuel cell module 12, opens into a second subsection 12b, running approximately perpendicularly with respect to the longitudinal axis 14, through a cut-out in the upper cover plate 6. The second subsection 12b opens into a third subsection 12c, which is disposed approximately parallel to the longitudinal axis 14 on the opposite edge and extends over the entire length of the solid electrolyte high temperature fuel cell module 2. The third subsection 12c opens through a cut-out 54 in the base plate 56 into the second duct section 16. The second duct section 16 is disposed approximately parallel to the third subsection 12c of the first duct section 12 and communicates with the fuel cells 4.

In this preferred configuration, the operating medium is thus heated on a path which corresponds to more than twice the length of the solid electrolyte high temperature fuel cell module 2, before it is fed into the fuel cells 4.

Figure 4:
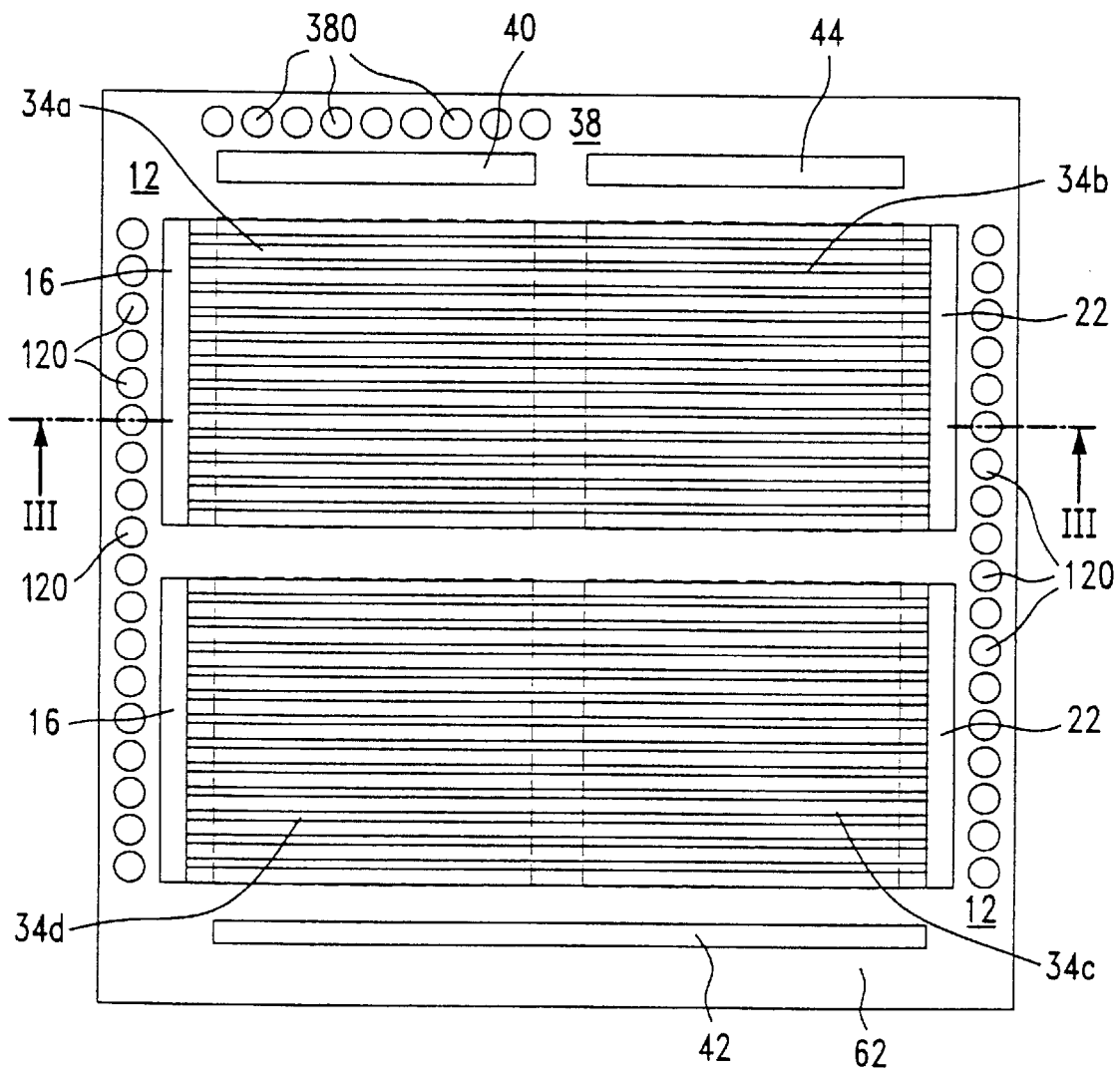
FIG. 4 is a plan view of a bipolar plate of a solid electrolyte high temperature fuel cell module according to the invention.

FIG. 4 is a plan view that shows the construction of a bipolar plate 62, which is constructed according to the same principle as that in FIG. 2. In the present embodiment, in each case the first duct sections 12 and 38 respectively include a number of a plurality of parallel duct sections 120 and 380 of circular cross section, for the first and second operating media.

The surface for picking up the heat is enlarged by enlarging the number of respective duct sections 120 and 380. This leads to an improved dissipation of heat.

We claim:

1. In a solid electrolyte high temperature fuel cell module having a longitudinal axis, a length along the longitudinal axis, and a periphery, the improvement comprising:

a plurality of fuel cells stacked on one another for receiving an operating medium necessary for operating said fuel cells; and first and second duct sections constructed within the solid electrolyte high temperature fuel cell module for heating the operating medium before the operating medium flows into said fuel cells;

said first duct section disposed adjacent the periphery, extending substantially parallel to the longitudinal axis, extending over the entire length of the fuel cell module and opening into said second duct section; and said second duct section disposed substantially parallel to said first duct section and communicating with said fuel cells.

2. The solid electrolyte high temperature fuel cell module according to claim 1, including:

a first edge opposite a second edge, said first duct section disposed adjacent said first edge;

a top cover plate having a cut-out formed therein; and a base plate having a cut-out formed therein;

said first duct section having first, second and third subsections;

said first subsection disposed substantially parallel to the longitudinal axis adjacent said second edge and extending over the entire length of the fuel cell module;

said second subsection extending substantially perpendicular to the longitudinal axis through said cut-out in said top cover plate and opening into said third subsection;

said third subsection disposed substantially parallel to the longitudinal axis adjacent said first edge and extending over the entire length of the fuel cell module, through said cut-out in said base plate and opening into said second duct section; and said second duct section disposed substantially parallel to said third subsection.

3. The solid electrolyte high temperature fuel cell module according to claim 2, including at least one other first duct section, said first duct sections being mutually parallel.

4. The solid electrolyte high temperature fuel cell module according to claim 3, wherein said first duct sections have a circular cross section.

5. The solid electrolyte high temperature fuel cell module according to claim 4, wherein said first and second duct sections for feeding and heating the operating medium are coated with catalytic material for reforming a combustion medium contained in the operating medium.

6. A solid electrolyte high temperature fuel cell module comprising:

a multiplicity of fuel cells stacked on top of each other and defining a periphery;

a first duct section defined by cut-outs in said multiplicity of fuel cells, said first duct section adjacent said periphery of said fuel cells and extending through all of said fuel cells for directing an operating medium through a first path; and a second duct section defined by cut-outs in said multiplicity of fuel cells, said second duct section communicating with said first duct section and extending through all of said fuel cells for directing the operating medium through a second path opposite in direction to the first path, said second duct section communicating with said fuel cells for providing the operating medium to said fuel cells.

7. The fuel cell module according to claim 6, wherein said periphery has a first side opposite a second side, and including:

a base plate; and a top cover plate, said fuel cells disposed between said base plate and said top cover plate;

said first duct section having a first subsection extending adjacent said first side and through all of said fuel cells, a second subsection extending through said top cover plate, and a third subsection extending adjacent said second side and through all of said fuel cells.

* * * * *